United States Patent [19]
Gross

[11] Patent Number: 4,876,525
[45] Date of Patent: Oct. 24, 1989

[54] EMERGENCY WARNING BRAKE SYSTEM

[76] Inventor: Sylvia Gross, 228 E. St., Easthampton, Mass. 01027

[21] Appl. No.: 158,794

[22] Filed: Feb. 22, 1988

[51] Int. Cl.⁴ .................................................. B60Q 1/26
[52] U.S. Cl. .................................... 340/436; 188/1.11
[58] Field of Search .............. 340/52 R, 72, 81 R, 340/69, 52 B; 188/1.11; 303/103

[56] References Cited

U.S. PATENT DOCUMENTS

| | | | |
|---|---|---|---|
| 4,252,014 | 2/1981 | Ruof | 340/52 B |
| 4,663,609 | 5/1987 | Rosario | 340/52 B |
| 4,709,223 | 11/1987 | Crapanzano | 340/52 B |

FOREIGN PATENT DOCUMENTS

2537066  6/1984  France ............................ 340/52 B

Primary Examiner—Joseph A. Orsino
Assistant Examiner—Jeffery A. Hofsass

[57] ABSTRACT

On a vehicle, an emergency signal indicating a skidding condition is displayed by flashing the brake lights which are controlled by an antiskid brake system.

1 Claim, 1 Drawing Sheet

EMERGENCY WARNING BRAKE SYSTEM

REFERENCES CITED

U.S. Pat. No. 4,252,014, 2/1981, Ruof . . . 340/52B.
U.S. Pat. No. 4,663,609, 5/1987, Rosario . . . 340/52B.
U.S. Pat. No. 4,709,223, 11/1987, Crapanzano . . . 340/52B.

BACKGROUND OF THE INVENTION

1. Field of the Invention

The subject invention relates to an improvement over standard brake lights on vehicles equipped with an antiskid brake system (A.B.S.). The system invented provides flashing brake lights when the A.B.S. vehicle on which it is installed is undergoing a skidding (wheel locked) situation. To other motorists, these flashing lights identify an emergency situation of the vehicle on which they are installed.

2. Description of Prior Art

U.S. Pat. Nos. 4,252,014 (Ruof) and 4,709,223 (Crapanzano) cited above are most closely related to the invention described in this patent. Both of these prior art patents claim diagnostic circuits used to analyze the functional status of the antiskid brake system. Both inventions were intended to be monitored by the A.B.S. vehicle operator. The invention disclosed herein is used to signal other motorists that the antiskid brake system is engaged only-no functional check is performed.

In both prior art inventions, logic circuits for comparison to accepted values, special control circuitry, signal conditioners, gates, etc. are required. The invention herein is much simpler and requires none of these components-this invention displays the A.B.S. signal as apposed to analyzing it.

Neither Crapanzano nor Ruof introduce novel components, but rather arrange existing components in a scheme to produce controlled results under given conditions which are unique. The invention of this patent also accomplishes its novelty in the same manner.

SUMMARY OF THE INVENTION

The intent of this invention is to promote vehicle safety by signaling to other motorists that an A.B.S. equipped vehicle is in an emergency or potentially hazardous stopping situation, thus warning these motorists of the situation. This goal is accomplished by flashing the brake lights of the vehicle having this invention installed, indicating that the brakes have been locked.

DESCRIPTION OF THE PREFERRED EMBODIMENTS

Figure 1:
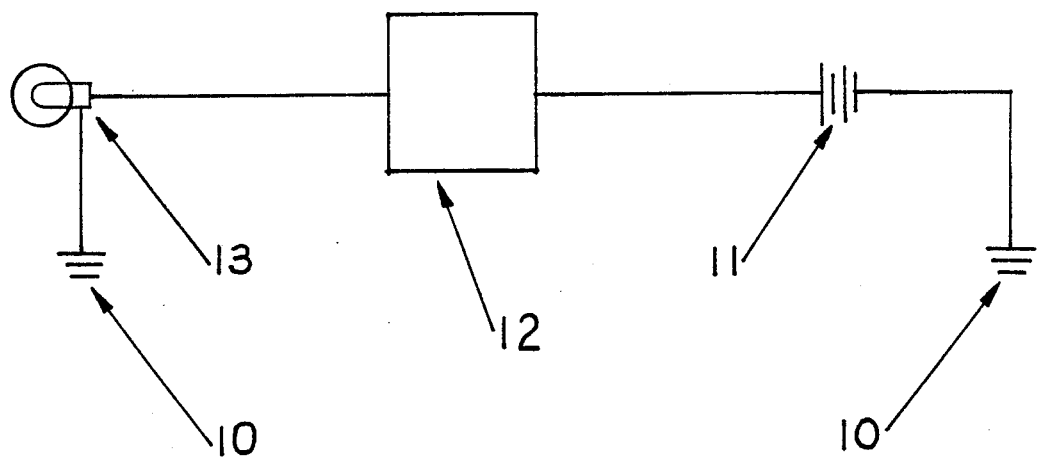
FIG. 1 is a schematic showing the emergency warning brake system, activated by an antiskid brake system control unit, controlling the brake signal to flash.

The emergency warning brake system (E.W.B.S.) in combination with an antiskid brake system (A.B.S.) will be described herein. The purpose of the invention, E.W.B.S., is to promote vehicle safety by warning other motorists that the vehicle equipped with E.W.B.S. is undergoing an emergency stopping condition. This is accomplished by flashing brake lights. This warning will be much appreciated by motorists in vehicles not equipped with A.B.S. since the A.B.S. vehicle is at a braking advantage, and a rear end collision with the A.B.S. vehicle is more likely. The advantage of stopping quick and under control with A.B.S. brake is diminished greatly when the A.B.S. vehicle is rearended.

The E.W.B.S. could be installed on an A.B.S. equipped vehicle as follows. The switch which activates the solenoid causing pulsating hydraulic pressure in the brake system would be connected in parallel to the brake lights. This would flash the brake lights at the same frequency that the brakes pulsate at.

Obviously with a microprocessor controlled brake system, brake signal control variations are endless (i.e. oscillation frequency, sequencing, hydraulic pressure setting, lag times, duration, e.t.c.). FIG. 1 shows the general control scheme where a current is supplied from the battery (ref. 11), to the antiskid brake system control unit (ref. 12); and the A.B.S. control unit transmits a controlled current to the brake signal (ref. 13) indicating the operational status of the A.B.S. system (i.e. the brakes may be hydraulically pulsating under emergency conditions or they may be operating continuously under normal conditions). Reference 10 is the common ground.

A general description, rather than specific wiring diagrams, has been presented above due to the general nature of the claims which follow.

Obviously this invention may be realized by several variations. It is not wished to be confined to details of construction, but rather to define the invention by functional purpose.

What is claimed is:

1. In a vehicle equipped with an external signal visible to other motorists, which indicates that the brakes of said vehicle have been applied; and equipped with an antiskid brake system:
control system, in combination with an antiskid brake system, in combination with an external brake signal visible to other motorists, controlling the brake signal to pulsate when the antiskid brake system pulsates.

* * * * *